(12) United States Patent
Sugiyama

(10) Patent No.: US 11,005,230 B2
(45) Date of Patent: May 11, 2021

(54) COMBINER, FIBER LASER DEVICE, AND METHOD FOR MANUFACTURING COMBINER

(71) Applicant: Fujikura Ltd., Tokyo (JP)

(72) Inventor: Naoyuki Sugiyama, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 16/611,765

(22) PCT Filed: May 10, 2018

(86) PCT No.: PCT/JP2018/018129
§ 371 (c)(1),
(2) Date: Nov. 7, 2019

(87) PCT Pub. No.: WO2018/207872
PCT Pub. Date: Nov. 15, 2018

(65) Prior Publication Data
US 2020/0067261 A1 Feb. 27, 2020

(30) Foreign Application Priority Data
May 11, 2017 (JP) .............................. JP2017-094607

(51) Int. Cl.
*H01S 3/23* (2006.01)
*G02B 6/255* (2006.01)
(Continued)

(52) U.S. Cl.
CPC .......... *H01S 3/2383* (2013.01); *G02B 6/2551* (2013.01); *G02B 6/2856* (2013.01);
(Continued)

(58) Field of Classification Search
CPC ............... H01S 3/2383; H01S 3/06783; H01S 3/094003; H01S 3/0675; H01S 3/09415; G02B 6/2551; G02B 6/2856; G02B 6/443
See application file for complete search history.

(56) References Cited

U.S. PATENT DOCUMENTS 3,328,143 A * 6/1967 Hicks, Jr. ............... C03B 37/028
65/411
4,586,784 A * 5/1986 Tremblay ............. G02B 6/2856
264/1.25
(Continued)

FOREIGN PATENT DOCUMENTS

JP  H01-191808 A  8/1989
JP  H04-313708 A  11/1992
(Continued)

OTHER PUBLICATIONS

International Search Report issued in corresponding International Application No. PCT/JP2018/018129 dated Jul. 24, 2018 (2 pages).

*Primary Examiner* — Peter Radkowski
(74) *Attorney, Agent, or Firm* — Osha Bergman Watanabe & Burton LLP

(57) ABSTRACT

A combiner, that optically combines input fibers that propagate pumping light launched from pumping light sources and a relay fiber connected to an amplification fiber, includes: a bundle portion where the input fibers are bundled together; and a melting portion where the input fibers are melted and integrated together. In an interface between the relay fiber and the melting portion, the input fibers are fused together without a gap between the input fibers.

10 Claims, 5 Drawing Sheets

(51) Int. Cl.
*G02B 6/28* (2006.01)
*G02B 6/44* (2006.01)
*H01S 3/067* (2006.01)
*H01S 3/094* (2006.01)
*H01S 3/0941* (2006.01)

(52) U.S. Cl.
CPC .......... *G02B 6/443* (2013.01); *H01S 3/06783* (2013.01); *H01S 3/094003* (2013.01); *H01S 3/0675* (2013.01); *H01S 3/09415* (2013.01)

(56) References Cited

U.S. PATENT DOCUMENTS

| | | | | |
|---|---|---|---|---|
| 5,171,345 | A * | 12/1992 | Takemura | C03B 37/15 385/43 |
| 5,373,572 | A * | 12/1994 | Arkwright | G02B 6/2856 385/43 |
| 5,448,673 | A * | 9/1995 | Murphy | G02B 6/2835 385/123 |
| 5,809,189 | A * | 9/1998 | Murphy | G02B 6/2856 385/123 |
| 6,208,678 | B1 * | 3/2001 | King | H01S 5/06213 372/6 |
| 6,275,628 | B1 * | 8/2001 | Jones | G02B 6/02057 385/29 |
| 7,046,875 | B2 * | 5/2006 | Gonthier | G02B 6/02009 385/27 |
| 7,272,956 | B1 * | 9/2007 | Anikitchev | G02B 6/2835 385/115 |
| 7,532,792 | B2 * | 5/2009 | Skovgaard | G02B 6/02376 385/24 |
| 7,839,902 | B2 * | 11/2010 | Li | H01S 3/005 372/6 |
| RE44,262 | E * | 6/2013 | Gonthier | G02B 6/02009 385/28 |
| 8,744,224 | B2 * | 6/2014 | Wysocki | G02B 6/04 385/43 |
| 9,140,856 | B2 * | 9/2015 | Fomin | G02B 6/2856 |
| 9,634,461 | B1 * | 4/2017 | Johnson | G02B 6/2746 |
| 9,897,759 | B2 * | 2/2018 | Botheroyd | H01S 3/094053 |
| 2005/0094952 | A1 * | 5/2005 | Gonthier | G02B 6/14 385/100 |
| 2007/0212006 | A1 * | 9/2007 | Wysocki | G02B 6/04 385/115 |
| 2008/0050069 | A1 * | 2/2008 | Skovgaard | G02B 6/2856 385/39 |
| 2008/0219299 | A1 * | 9/2008 | Lewis | H01S 3/06758 372/6 |
| 2009/0175301 | A1 * | 7/2009 | Li | B23K 26/0626 372/6 |
| 2009/0202204 | A1 * | 8/2009 | Nielsen | G02B 6/2551 385/43 |
| 2014/0241663 | A1 * | 8/2014 | Fomin | G02B 6/2856 385/28 |
| 2017/0017036 | A1 * | 1/2017 | Botheroyd | H01S 3/094007 |

FOREIGN PATENT DOCUMENTS

| | | |
|---|---|---|
| JP | 2005-352289 A | 12/2005 |
| JP | 2006-337399 A | 12/2006 |
| JP | 2008-009390 A | 1/2008 |
| JP | 2009-124014 A | 6/2009 |
| JP | 2010-028053 A | 2/2010 |
| JP | 2010-232634 A | 10/2010 |
| JP | 2014-123648 A | 7/2014 |
| JP | 2015-022133 A | 2/2015 |
| JP | 2015-040992 A | 3/2015 |
| JP | 2015-094840 A | 5/2015 |
| JP | 2017-053884 A | 3/2017 |

* cited by examiner

COMBINER, FIBER LASER DEVICE, AND METHOD FOR MANUFACTURING COMBINER

CROSS-REFERENCE TO RELATED APPLICATIONS

This is a national stage application of International Patent Application No. PCT/JP2018/018129, filed on May 10, 2018 and claims priority from Japanese Patent Application No. 2017-094607 filed on May 11, 2017, the entire contents of which are incorporated herein by reference.

TECHNICAL FIELD

The present invention relates to a combiner, a fiber laser device, and a method for manufacturing a combiner.

BACKGROUND

A fiber laser device as described in Patent Document 1 has been realized. This fiber laser device includes a plurality of pumping light sources configured to launch pumping light, a plurality of input fibers configured to be connected to the respective pumping light sources and propagate the pumping light, and an amplification fiber configured to amplify the pumping light, and laser light is launched to the outside from a launch end of a fiber for output. In addition, as a combiner that is used in the fiber laser device, Patent Document 1 discloses a configuration in which a bundle portion in which a plurality of the input fibers are bundled together and a relay fiber that is connected to the amplification fiber are optically combined together through a bridge fiber.

Patent Literature

[Patent Document 1] Japanese Unexamined Patent Application, First Publication No. 2014-123648

In this type of fiber laser device, there is a case where light or the like amplified in the amplification fiber is back-reflected to the combiner and the combiner is broken by this optical feedback. For example, in the combiner having the configuration of Patent Document 1, a gap is generated between the input fibers at a fusion-spliced portion between the bundle portion and the bridge fiber. Therefore, in the fusion-spliced portion between the bundle portion and the bridge fiber, there is a case where optical feedback leaks through the gap between the input fibers and strikes a coating of the input fibers, thereby causing the coating to generate considerable heat. When the coating of the input fibers strongly generates heat, there is a possibility that the combiner may be broken.

SUMMARY

One or more embodiments of the present invention limit the occurrence of the breakage of a combiner attributed to optical feedback.

In one or more embodiments, a combiner is configured to optically combine a plurality of input fibers which propagate pumping light launched from pumping light sources and a relay fiber which is connected to an amplification fiber, the combiner having a bundle portion in which the plurality of input fibers are bundled together and a melting portion at which the plurality of input fibers are melted and integrated together, in which, in an interface between the relay fiber and the melting portion, the plurality of input fibers fuse together without a gap.

According to the combiner of one or more embodiments, outer circumferences of glass portions (outer circumferences of clads) of the plurality of input fibers fuse together without a gap in the interface between the relay fiber and the melting portion. Therefore, even when optical feedback from the amplification fiber reaches the interface between the relay fiber and the melting portion, it is possible to prevent the optical feedback from leaking through the gap between the outer circumferences of the glass portions of the input fibers and striking coatings of the input fibers. Therefore, it is possible to limit the occurrence of the breakage of the combiner attributed to the strong heat generation in the coatings of the input fibers.

Here, an outer diameter of a clad located on the outermost layer of the relay fiber may be larger than an outer diameter of the melting portion in the interface, and a level difference may be formed in a fusion-spliced portion between the melting portion and the relay fiber.

In such a case, it becomes possible to allow the optical feedback that propagates through an outer circumferential portion of the relay fiber to escape to the outside, and it is possible to reliably prevent the optical feedback from entering pumping light sources through the input fibers or from striking the coatings of the input fibers.

In addition, a tubular member (tube) for closely attaching the plurality of input fibers together may not be disposed on an outer circumference of the melting portion.

In such a case, the optical feedback that propagates through the outer circumferential portion of the relay fiber being combined to the tubular member and reaching near the coatings of the input fibers is limited.

In addition, an entire outer circumferential surface of the melting portion may be in contact with air.

In such a case, it becomes possible to allow the optical feedback that propagates through the outer circumferential portion of the relay fiber to escape to the outside.

In addition, when a total value of transverse cross-sectional areas of the plurality of input fibers is represented by $S1$, and a transverse cross-sectional area of the melting portion in the interface is represented by $S2$, $S1 \div S2 \leq 1.21$ is satisfied.

In this case, the numerical aperture of the input fiber becomes almost uniform in the bundle portion and the melting portion, and it is possible to limit an increase in the loss of the pumping light attributed to an increase in the numerical aperture.

In addition, in one or more embodiments, a fiber laser device includes the combiner.

In addition, in one or more embodiments, a method for manufacturing a combiner that is configured to optically combine a plurality of input fibers which propagate pumping light launched from pumping light sources and a relay fiber which is connected to an amplification fiber is provided. The method includes: a bundling step of forming a bundle portion by gathering the plurality of input fibers together, a fixing step of fixing the bundle portion at a first fixing portion and a second fixing portion that are positioned at mutually different locations in a longitudinal direction, a melting step of forming a melting portion by melting a portion between the first fixing portion and the second fixing portion in the bundle portion, and a cutting step of cutting the melting portion.

According to the manufacturing method of one or more embodiments, the plurality of input fibers are melted in a state of being gathered together in the melting step, and thus, in association with the melting, the out circumferences of the glass portions of the input fibers fuse together without a gap. In such a case, it is possible to limit the generation of a gap between the outer circumferences of the glass portions of the input fibers in the melting portion.

In addition, an outer diameter of a clad located on the outermost layer of the relay fiber may be larger than an outer diameter of the melting portion in an interface between the relay fiber and the melting portion, and a level difference may be formed in a fusion-spliced portion between the melting portion and the relay fiber.

In such a case, it is possible to manufacture a combiner capable of obtaining the above-described action effect.

In addition, a tubular member for closely attaching the plurality of input fibers together may not be used.

In such a case, it is possible to manufacture a combiner capable of obtaining the above-described action effect. Furthermore, the non-use of the tubular member facilitates the escape of the air present in the gap between the outer circumferences of the glass portions of the input fibers in the melting step. Therefore, it is possible to reliably fuse the outer circumferences of the glass portions of the input fibers without a gap.

In addition, in the bundling step, the plurality of input fibers may be twisted together in a state of being bundled with an end portion fixed.

In such a case, it is possible to form the bundle portion in a state in which the glass portions of the respective input fibers are closely attached together.

In addition, the first fixing portion and the second fixing portion may be formed of an adhesive material, and in the bundle portion, the outer circumferences of the plurality of input fibers may be in contact with each other.

In such a case, it is possible to reliably maintain a state in which the outer circumferences of the glass portions of the input fibers are in contact with each other. Furthermore, it is possible to limit an increase in an outer diameter of the combiner.

According to the above-described embodiments of the present invention, it is possible to limit the occurrence of the breakage of the combiner attributed to optical feedback.

DETAILED DESCRIPTION

Hereinafter, configurations of a combiner and a fiber laser device according to one or more embodiments will be described with reference to FIG. 1 to FIG. 3C.

(Fiber Laser Device)

Figure 1:
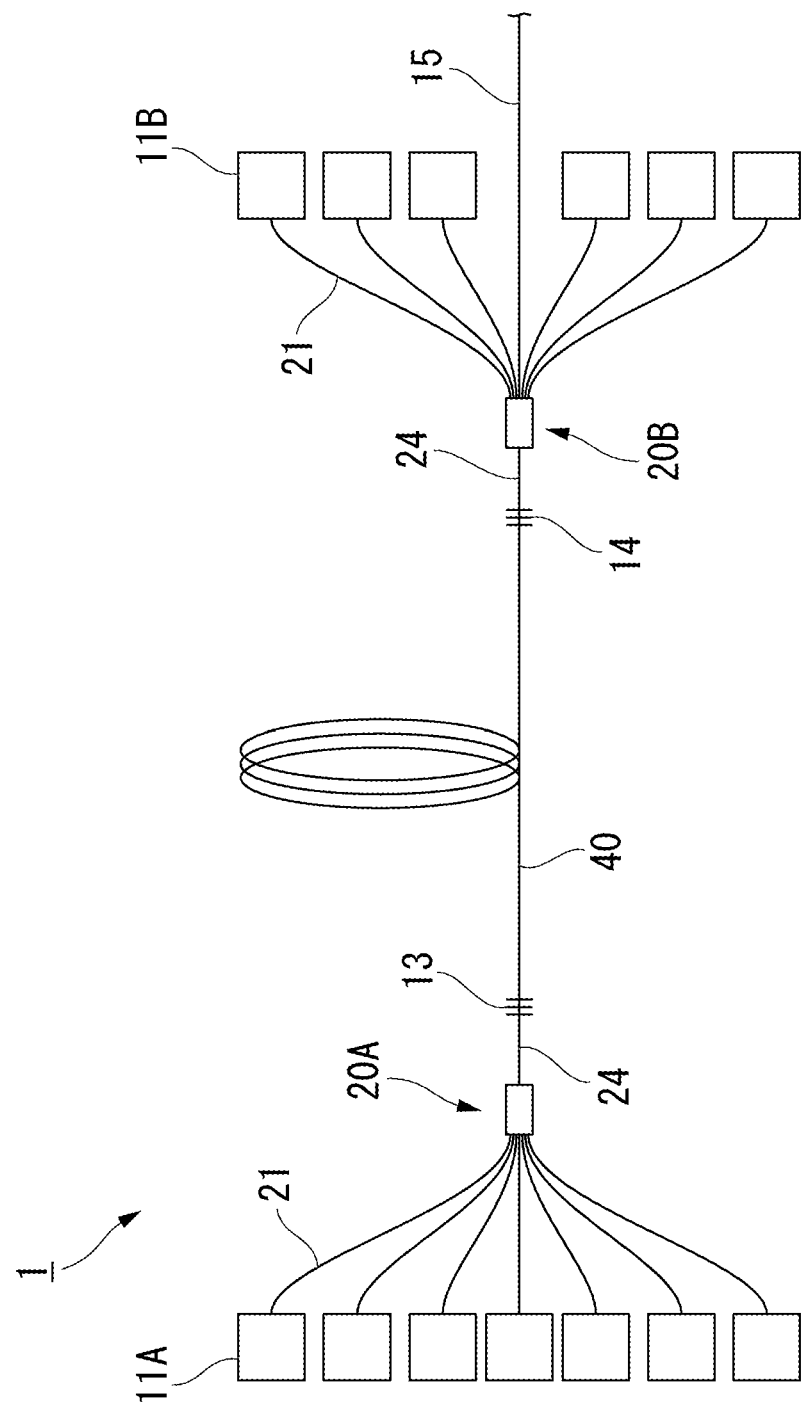
FIG. 1 is a schematic view of a fiber laser device according to one or more embodiments.

As shown in FIG. 1, a fiber laser device 1 according to one or more embodiments is a resonance-type fiber laser. The fiber laser device 1 includes front pumping light sources 11A, rear pumping light sources 11B, a first combiner 20A, a second combiner 20B, a first fiber Bragg grating (FBG) 13, a second FBG 14, an amplification fiber 40, and a launching fiber 15.

The fiber laser device 1 is a device configured to amplify pumping light that is launched from the respective pumping light sources 11A and 11B in the amplification fiber 40 and to launch laser light from a launch end of the launching fiber 15.

Meanwhile, in one or more embodiments, the front pumping light source 11A side of the amplification fiber 40 will be referred to as the front side, and the rear pumping light source 11B side of the amplification fiber will be referred to as the rear side.

In addition, a cross section perpendicular to the longitudinal direction of the respective configurational members will be referred to as a transverse cross section. In addition, the cross-sectional area of each configurational member on the transverse cross section will be referred to as the transverse cross sectional area. For example, in an optical fiber, a direction along the central axis of the optical fiber is the longitudinal direction, and a cross section perpendicular to the central axis is the transverse cross section.

A plurality of the front pumping light sources 11A and a plurality of the rear pumping light sources 11B are disposed so as to sandwich the amplification fiber 40 in the longitudinal direction. The front pumping light sources 11A launch front pumping light toward the amplification fiber 40, and the rear pumping light sources 11B launch rear pumping light toward the amplification fiber 40. As these pumping light sources 11A and 11B, for example, laser diodes can be used.

The amplification fiber 40 has a core to which one or more kinds of active elements are added, a first clad covering the core, a second clad covering the first clad, and a coating layer covering the second clad. As the active element, for example, a rare earth element such as erbium (Er), ytterbium (Yb), or neodymium (Nd) is used. Silica glass or the like can be used as the core and the first clad, and a resin or the like can be used as the second clad and the coating layer.

The first FBG 13 is fused to a front-side end portion of the amplification fiber 40. The first FBG 13 is adjusted so as to reflect some of light (signal light) that the active element in the amplification fiber 40 in an excited state discharges. The first FBG 13 has a structure in which portions having a high refractive index are arranged at regular intervals along the longitudinal direction.

The second FBG 14 is fused to a rear-side end portion of the amplification fiber 40. The second FBG 14 has almost the same structure as the first FBG 13, but is adjusted so as to reflect light at a reflectivity lower than that of the first FBG 13.

In the amplification fiber 40, the signal light reflected by the first FBG 13 and the second FBG 14 reciprocates in the longitudinal direction of the amplification fiber 40. The signal light is amplified in association with the reciprocation and turns into laser light. Some of the laser light permeates through the second FBG 14, enters the launching fiber 15, and is launched from the launch end of the launching fiber 15.

(Combiner)

The first combiner 20A and the second combiner 20B are disposed on both sides of the amplification fiber 40 in the longitudinal direction.

The first combiner 20A and the second combiner 20B respectively include a plurality of input fibers 21 and a relay fiber 24 and optically combine the input fibers 21 and the relay fiber 24.

The first combiner 20A is connected to the front-side end portion of the amplification fiber 40 through the relay fiber 24 and the first FBG 13. The first combiner 20A optically combines the plurality of input fibers 21 and the relay fiber 24. The input fibers 21 connected to the respective front pumping light sources 11A propagate the front pumping light launched from the respective front pumping light sources 11A. The relay fiber 24 is connected to the amplification fiber 40 through the first FBG 13.

The second combiner 20B is connected to the rear-side end portion of the amplification fiber 40 through the relay fiber 24 and the second FBG 14. The second combiner 20B optically combines the plurality of input fibers 21 and the relay fiber 24. The input fibers 21 connected to the respective rear pumping light sources 11B propagate the rear pumping light launched from the respective rear pumping light sources 11B. The relay fiber 24 is connected to the amplification fiber 40 through the second FBG 14.

The launching fiber 15 is disposed in the center of the second combiner 20B. The launching fiber 15 transmits the laser light. As the launching fiber 15, a single-mode fiber or the like can be used.

In one or more embodiments, the front pumping light sources 11A and the first combiner 20A are disposed on the front side of the amplification fiber 40, and the rear pumping light sources 11B and the second combiner 20B are disposed on the rear side of the amplification fiber. Therefore, it is possible to cause pumping light to be incident on the amplification fiber 40 from both sides in the longitudinal direction. With this configuration, it is possible to launch laser light having a higher intensity from the launching fiber 15. In addition, it is possible to halve the amount of pumping light caused to be incident on a single side of the amplification fiber 40 in order to obtain the same amount of the signal light compared with a case where pumping light is caused to be incident on the amplification fiber 40 only from a single side of the amplification fiber 40 in the longitudinal direction. Therefore, it is possible to limit the attenuation of the signal light in the amplification fiber 40 to a small extent by shortening the length of the amplification fiber 40 and to improve the efficiency of the fiber laser device 1.

There is a case where pumping light having a high intensity that is not absorbed by the amplification fiber 40 enters the combiners 20A and 20B. Therefore, it becomes necessary to configure the fiber laser device so that the combiners 20A and 20B do not break even when not only optical feedback from the launch end of the launching fiber 15 but also pumping light having a high intensity that was not absorbed by the amplification fiber 40 enter the combiners 20A and 20B. Particularly, a phenomenon in which light leaking toward the input fibers 21 from the end portions of the relay fiber 24 connected to the combiners 20A and 20B strikes the coating layers of the input fibers 21 and the coating layers strongly generate heat occurs.

Therefore, in one or more embodiments, the combiners 20A and 20B are configured as described below, and thus the phenomenon of the strong heat generation in the coating layers of the input fibers 21 is prevented. The first combiner 20A and the second combiner 20B have the same configuration, and thus, in the following description, the configuration of the first combiner 20A will be described as a representative of these combiners.

As shown in FIG. 2 and FIGS. 3A to 3C, the input fiber 21 according to one or more embodiments has a core 21a, a clad 21b surrounding the core 21a, and a coating 21c coating the clad 21b. Hereinafter, the core 21a and the clad 21b will be collectively referred to simply as the glass portion. As the input fiber 21, a multimode fiber having a glass portion with an outer diameter of 125 μm or the like can be used.

In one or more embodiments, the number of the input fibers 21 that the first combiner 20A includes may be a number at which a close-packed structure is formed when the outer circumferences of the respective input fibers 21 are closely attached together (seven fibers, 19 fibers, or the like).

Figure 2:
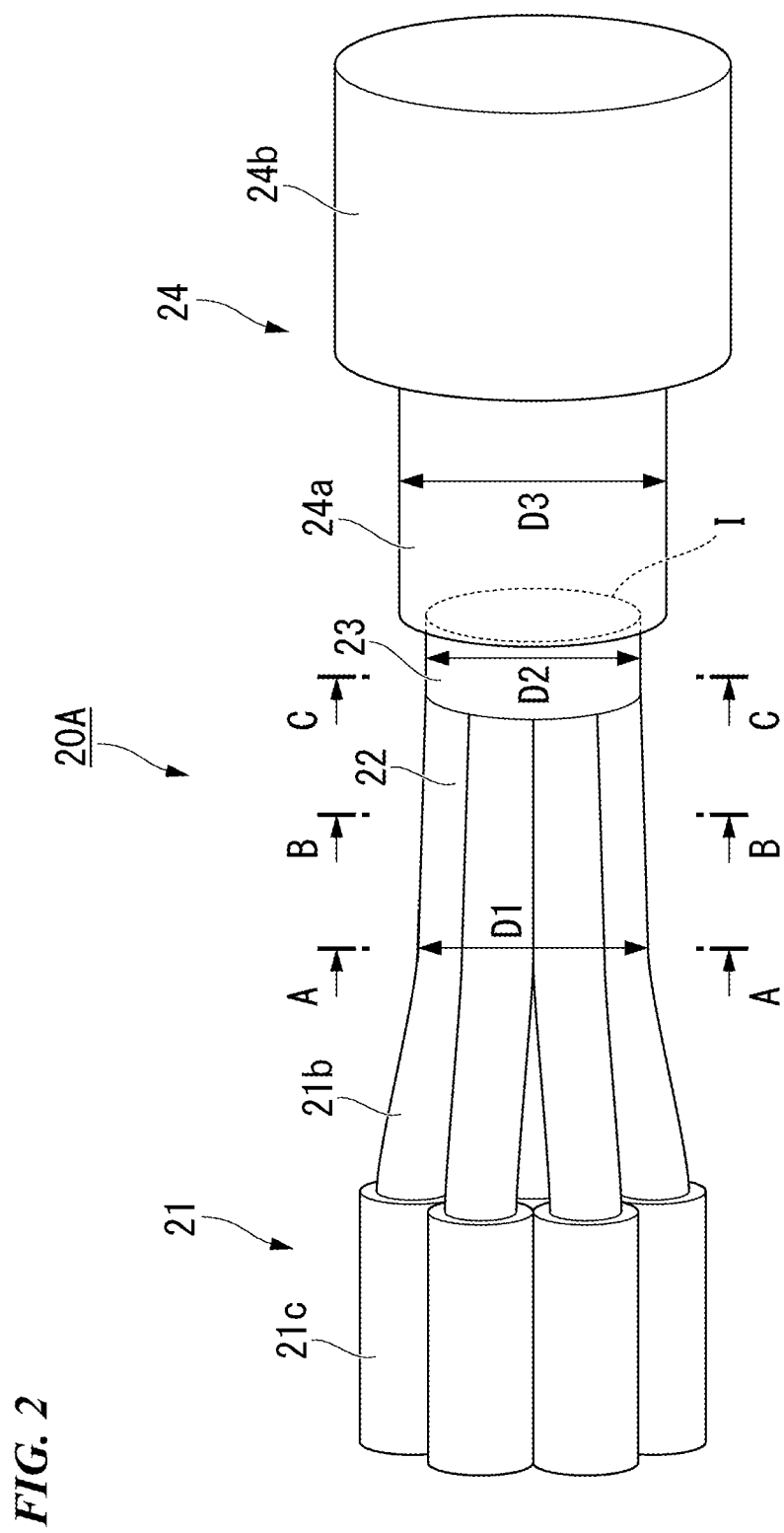
FIG. 2 is a perspective view showing a configuration of a first combiner according to one or more embodiments.

As shown in FIG. 2, the first combiner 20A includes a bundle portion 22 in which the glass portions of the plurality of input fibers 21 are bundled together and a melting portion 23 in which these glass portions are melted and integrated together.

Figure 3A:
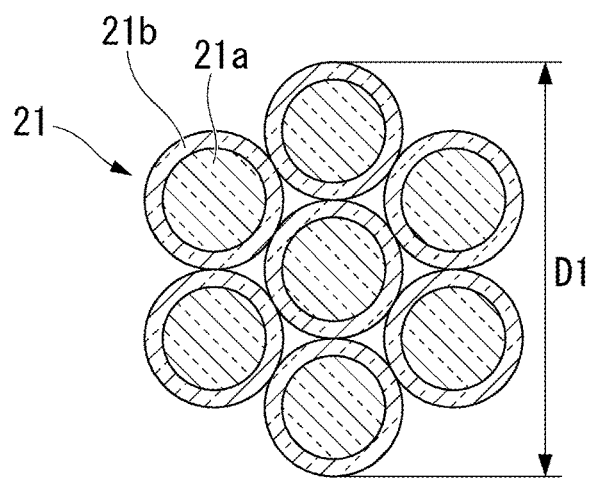
FIG. 3A is a cross-sectional view in a direction of A-A in FIG. 2.

In the bundle portion 22, the outer circumferences of the glass portions of the input fibers 21 are bundled together in a state of being in contact with each other as shown in FIG. 3A. In addition, in the bundle portion 22 shown in FIG. 3B, each of the glass portions of the input fibers 21 is melted, and the outer circumferential portions of the glass portions are bundled together in a state of being closely attached together.

Figure 3B:
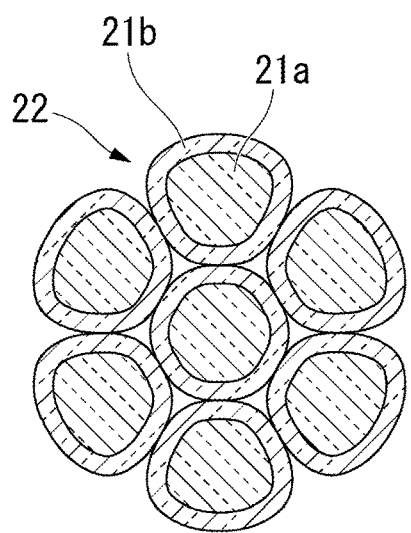
FIG. 3B is a cross-sectional view in a direction of B-B in FIG. 2.
Figure 3C:
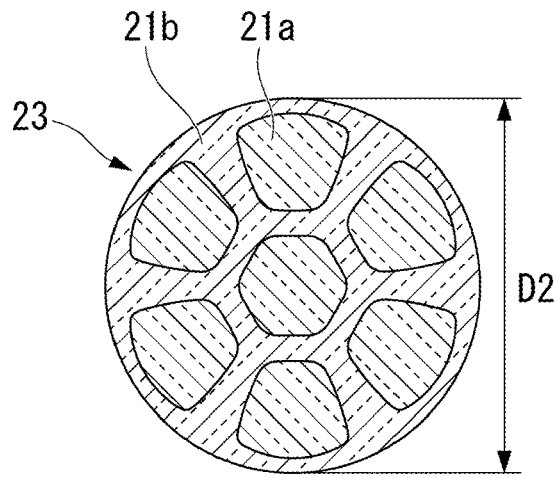
FIG. 3C is a cross-sectional view in a direction of C-C in FIG. 2.

As shown in FIG. 3C, the melting portion 23 is formed by melting and integrating each of the glass portions of the input fibers 21. An end portion of the melting portion 23 on the relay fiber 24 side is fused to the relay fiber 24.

As shown in FIG. 2 and FIG. 3C, the melting portion 23 is formed so that a gap between the outer circumferences of the glass portions of the input fibers 21 disappears in an interface between the relay fiber 24 and the melting portion 23 (hereinafter, the interface between the relay fiber 24 and the melting portion 23 is simply referred to as the interface I).

As shown in FIGS. 3A to 3C, the gap between the glass portions of the input fibers 21 gradually decreases toward the relay fiber 24. In addition, in the interface I between the melting portion 23 and the relay fiber 24, the gap between the outer circumferences of the glass portions of the input fibers 21 disappears as shown in FIG. 3C. The outer diameter of the melting portion 23 in the interface I is represented by a melting portion outer diameter D2. The outer diameter of the bundle portion 22 is represented by a bundle portion outer diameter D1. In one or more embodiments, the bundle portion outer diameter D1 refers to the outer diameter of a portion in the bundle portion 22 in which the glass portions of the input fibers 21 are not yet melted as shown in FIG. 2 and FIG. 3A. When the melting portion 23 is formed as described above, the melting portion outer diameter D2 becomes smaller than the bundle portion outer diameter D1. For example, in a case where the outer diameter of the clad 21b is 125 μm and the number of the input fibers in the bundle portion 22 is seven, the bundle portion outer diameter reaches D1=3×125 μm=375 μm (refer to FIG. 3A), and the melting portion outer diameter reaches D2=330 µm. Further, a tubular member (tube) for integrating the glass portions of the input fibers 21 (a capillary, a pipe material, a chassis, or the like) is not disposed on the outer circumferences of the bundle portion 22 and the melting portion 23, and the air is present on the outer circumference of the melting portion 23.

The front-side end portion of the relay fiber 24 is fused and connected to the rear-side end portion of the melting portion 23.

The rear-side end portion of the relay fiber 24 is connected to amplification fiber 40 through the first FBG 13. In more detail, the rear-side end portion of the relay fiber 24 is fused and connected to the front-side end portion of an FBG fiber in which the first FBG 13 is formed. Furthermore, the front-side end portion of the amplification fiber 40 is fused and connected to the rear-side end portion of the FBG fiber.

The relay fiber 24 is an optical fiber configured to bundle pumping light launched from the respective input fibers 21 and to launch the bundled pumping light to the amplification fiber 40. The relay fiber 24 includes a clad 24a and a coating 24b. The outer diameter of the clad 24a located on the outermost layer of the relay fiber 24 (hereinafter, simply referred to as the relay fiber outer diameter D3) is larger than the melting portion outer diameter D2. Therefore, a level difference is formed in a fusion-spliced portion between the melting portion 23 and the relay fiber 24. This level difference enables the discharge of optical feedback that has propagated through the outer circumferential side of the relay fiber 24 to the outside. Therefore, it is possible to limit, for example, optical feedback passing through the input fibers 21 and propagating to the pumping light sources.

In addition, it can be also considered to, for example, insert the glass portions of the plurality of input fibers 21 into the tubular member (a capillary, a pipe material, a chassis, or the like) and melt and integrate the outer circumferences of the plurality of input fibers 21. However, in this case, it is difficult for the air present in the gap between the glass portions of the input fibers 21 to escape, and it becomes difficult to fuse the glass portions together without a gap therebetween. In contrast, in one or more embodiments, the tubular member or the like is not disposed on the outer circumference of the melting portion 23. Therefore, it is possible to integrate the glass portions of the input fibers 21 together without a gap while easily removing the air present in the gaps.

Furthermore, the tubular member or the like is not disposed on the outer circumference of the melting portion 23, and the air is present. That is, the entire outer circumferential surface of the melting portion 23 is in contact with the air. Therefore, it becomes possible to escape the optical feedback that propagates in the outer circumferential portion of the relay fiber 24 toward the outside through the air. Therefore, it is possible to more reliably prevent the optical feedback from entering the pumping light sources 11A through the input fibers 21 or from striking the coatings of the input fibers 21.

By the way, the amount of the optical feedback that propagates to the front pumping light sources 11A can be decreased as the difference between the relay fiber outer diameter D2 and the melting portion outer diameter D2 increases. However, it becomes more difficult to design an optical circuit for amplification that is connected to the rear-side end portion of the relay fiber 24 as the outer diameter of the relay fiber 24 increases. In one or more embodiments, in order to balance the amount of the optical feedback and the complexity of the structure of the optical circuit for amplification, the relay fiber outer diameter D3 may be set to be approximately 1.1 times to 2 times the melting portion outer diameter D2.

(Transverse Cross Sectional Area of Melting Portion)

Here, the degree of elongation of the melting portion 23 in the longitudinal direction at the time of forming the melting portion 23 will be considered. The melting portion 23 is formed by melting the plurality of input fibers 21 and fusing the outer circumferences of the glass portions together. When tension acts on each of the input fibers 21 in the longitudinal direction during melting, each of the input fibers 21 fuses together in a state of being elongated in the longitudinal direction. As a result, there is case where the shape of the melting portion 23 to be formed becomes a taper shape having a diameter that decreases toward the relay fiber 24 side in the longitudinal direction.

When the melting portion 23 is formed in a taper shape as described above, the numerical aperture (NA) of pumping light increases, which causes the leakage of some of the pumping light in a connection portion between the melting portion 23 and the relay fiber 24. In addition, an increase in NA generates a component that cannot be totally reflected in an interface between the core 21a and the clad 21b, and the transmission loss increases. In addition, even when the transmission loss is tolerated, there is a possibility that scattered light from the fibers may increase the generation of heat in the coating portions of the fibers and other members that the light strikes and may cause breakage. Therefore, in one or more embodiments, the melting portion 23 may be formed in a shape having an outer diameter that does not change in the longitudinal direction as much as possible instead of a taper shape.

Hereinafter, the total value of the transverse cross sectional areas of the input fibers 21 before being melted will be referred to as the before-elongating total cross-sectional area S1. In addition, the transverse cross sectional area of the melting portion 23 in the interface I after the formation of the melting portion 23 will be referred to as the after-elongating cross-sectional area S2. In a case where the melting portion 23 has a taper shape as described above, the transverse cross sectional area of the melting portion 23 is minimized at the interface I, and the after-elongating cross-sectional area S2 becomes the minimum transverse cross sectional area of the melting portion 23.

The ratio of the numerical aperture increased by the melting of the input fibers 21 (NA conversion ratio R) is calculated using the following numerical expression (1).

$$R=\sqrt{(S1 \div S2)} \qquad (1)$$

When the NA conversion ratio R is 1.1 or less, an increase in the transmission loss is limited to approximately 1% to 2%, which is experimentally determined to be acceptable in one or more embodiments. On the basis of the above description, the following numerical expression (2) is obtained by assigning R≤1.1 to the numerical expression (1).

$$S1 \div S2 \le 1.21 \qquad (2)$$

That is, when the melting portion 23 is formed so that the before-elongating total cross-sectional area S1 and the after-elongating cross-sectional area S2 satisfy the numerical expression (2), it is possible to limit an increase in the transmission loss.

Generally, the before-elongating total cross-sectional area S1 becomes larger than the after-elongating cross-sectional area S2, and S1÷S2≥1 is satisfied. The following numerical expression (3) is obtained by combining this relational expression and the numerical expression (2).

$$1 \le S1 \div S2 \le 1.21 \qquad (3)$$

Next, the action of the combiner 20A configured as described above will be described.

Optical feedback that is back-reflected to the relay fiber 24 from the amplification fiber 40 is often multimode light. The multimode light is not parallel to the longitudinal direction of the relay fiber 24 and propagates through the relay fiber 24 at a certain degree of angle. Therefore, when the optical feedback reaches the interface I between the relay fiber 24 and the melting portion 23, in a case where there is a gap between the glass portions near the center of the interface I, the majority of light leaks through this gap and strikes the coatings 21c of the input fibers 21. Therefore, there has been a possibility that the coatings 21c may generate considerable heat. In contrast, when the glass portions of the input fibers 21 fuse together without a gap therebetween in the interface I as in one or more embodiments, it is possible to limit optical feedback leaking through a gap between the outer circumferences of the glass portions of the input fibers 21 and striking the coatings 21c.

As described above, according to the combiner 20A of one or more embodiments, the glass portions of the input fibers 21 melt without a gap therebetween in the interface I between the relay fiber 24 and the melting portion 23. With this configuration, it is possible to prevent optical feedback that propagates toward the input fibers 21 from the relay fiber 24 from leaking through the gap between the outer circumferences of the glass portions of the input fibers 21 in the interface I and striking the coatings 21c of the input fibers 21. Therefore, it is possible to limit the breakage of the combiner 20A attributed to the strong generation of heat by the coatings 21c.

In addition, the relay fiber outer diameter D3 of the clad 24a located on the outermost layer of the relay fiber 24 is larger than the melting portion outer diameter D2 of the melting portion 23 in the interface I, and thus a level difference is provided in the fusion-spliced portion between the melting portion 23 and the relay fiber 24. Therefore, it becomes possible to escape light that propagates through the outer circumferential portion of the relay fiber 24 to the outside, and it is possible to more reliably limit optical feedback entering the pumping light sources through the input fibers 21 or striking the coatings 21c.

In addition, the tubular member for closely attaching the plurality of input fibers 21 together is not disposed on the outer circumference of the melting portion 23. That is, the entire outer circumferential surface of the melting portion 23 is in contact with the air. Therefore, it becomes possible to allow the optical feedback that propagates through the outer circumferential portion of the relay fiber 24 to escape toward the air on the outer circumference of the melting portion 23 to the outside without being combined to the tubular member or the like. Furthermore, the optical feedback entering the pumping light sources 11A through the input fibers 21 or reaching near the coatings in the input fibers 21 is limited.

In addition, when the before-elongating total cross-sectional area S1 and the after-elongating cross-sectional area S2 satisfy S1÷S2≤1.21, the numerical aperture of the input fibers 21 becomes almost uniform in the bundle portion 22 and the melting portion 23, and it is possible to limit an increase in the loss of the pumping light attributed to an increase in the numerical aperture.

(Method for Manufacturing Combiner)

Next, an example of a method for manufacturing the combiner 20A will be described.

Figure 4A:
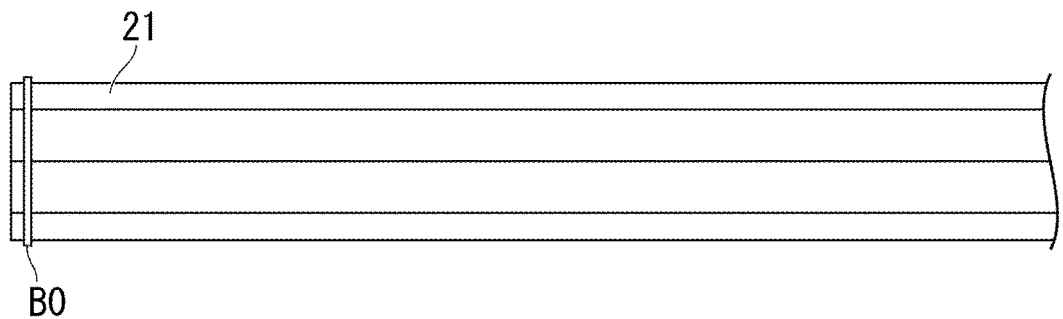
FIG. 4A is a view showing a step of fixing a bundle of input fibers in a method for manufacturing a combiner according to one or more embodiments.

First, as shown in FIG. 4A, the input fibers 21 according to one or more embodiments are arrayed, and an end portion B0 of a bundle of the input fibers 21 is fixed using a tool.

Figure 4B:
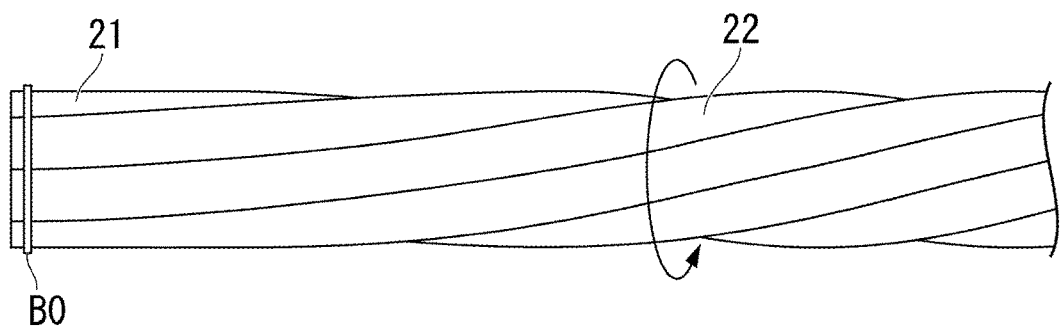
FIG. 4B is a view showing a bundling step in the method for manufacturing a combiner according to one or more embodiments.

Subsequent to the state shown in FIG. 4A, in one or more embodiments, the bundle of the input fibers 21 is twisted as shown in FIG. 4B. Therefore, the input fibers 21 located in the outer circumferential portion are gathered toward the input fiber 21 located in the central portion. Therefore, each of the glass portions of the input fibers 21 is closely attached together, thereby forming the bundle portion 22 (bundling step).

It can be also considered to, for example, elongate the glass portions in the longitudinal direction without twisting the input fibers 21, thereby bringing the outer circumferences of the glass portions into contact with each other. Here, in a case where the glass portions are excessively elongated and the melting portion 23 is formed in a taper shape, some of pumping light leaks in the connection portion between the melting portion 23 and the relay fiber 24 as described above. In one or more embodiments, the plurality of input fibers 21 are twisted in a state of being bundled with the end portion B0 fixed, whereby the input fibers 21 are gathered together. Therefore, it is not necessary to excessively stretch the melting portion 23, and it is possible to limit an increase in the loss of pumping light.

Figure 4C:
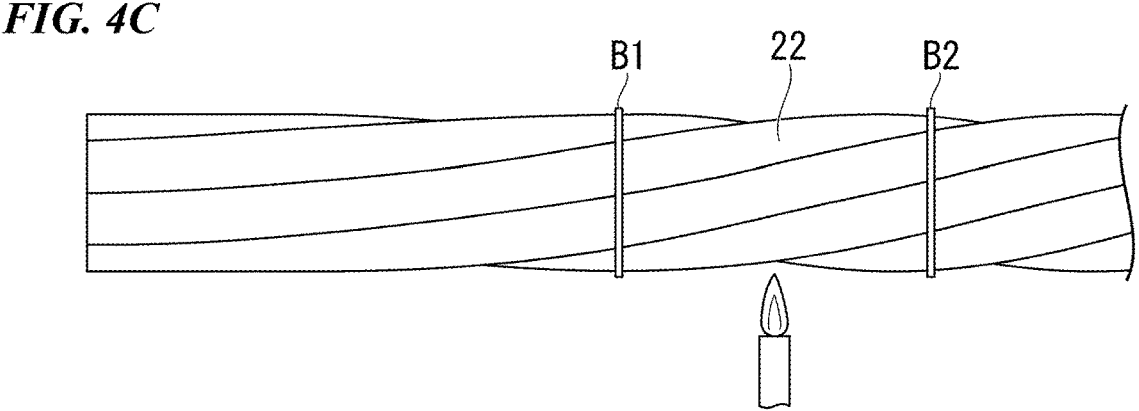
FIG. 4C is a view showing a fixing step and a welding step in the method for manufacturing a combiner according to one or more embodiments.

Subsequent to the bundling step, in one or more embodiments, the bundle portion 22 is fixed at the first fixing portion B1 and the second fixing portion B2 that are positioned at mutually different locations in the longitudinal direction as shown in FIG. 4C (fixing step). Therefore, a state in which the glass portions of the input fibers 21 are gathered together and are in contact with each other is maintained in the bundle portion 22. That is, in a portion between the first fixing portion B1 and the second fixing portion B2, a state in which the outer circumference of the glass portion of the input fiber 21 is in contact with the outer circumferences of the glass portions of other input fibers 21 that are adjacent to the above-described input fiber 21 is maintained.

In addition, the first fixing portion B1 and the second fixing portion B2 may be formed of an adhesive material such as a resin. When an adhesive material is used, it is possible to reliably maintain a state in which the outer circumferences of the glass portions are in contact with each other. As described above, compared with the case of using, for example, a tubular member, it is easier to maintain a state in which the outer circumferences of the glass portions are in contact with each other, and, furthermore, it is possible to limit an increase in the outer diameter of the combiner 20A.

Subsequent to the fixing step, the portion between the first fixing portion B1 and the second fixing portion B2 in the bundle portion 22 is heated, thereby melting the input fibers 21 and forming the melting portion 23 (melting step). In an example of FIG. 4C and FIG. 4D, in one or more embodiments, the glass portions are melted and integrated together to form the melting portion 23 in a central portion between the first fixing portion B1 and the second fixing portion B2 in the longitudinal direction. In the melting portion 23, the outer circumferences of the glass portions are fused together without a gap therebetween. In addition, in the bundle portion 22 at both ends of the melting portion 23, a state in which the outer circumferences of the glass portions of the input fibers 21 are in contact with each other is maintained.

In the melting step, a heating method such as oxyhydrogen flame, arc discharging, or $CO_2$ laser light irradiation can be used. In the melting step, tension acting on the bundle portion 22 is limited to a small extent so that the before-elongating total cross-sectional area S1 and the after-elongating cross-sectional area S2 do not change as much as possible.

Figure 4D:
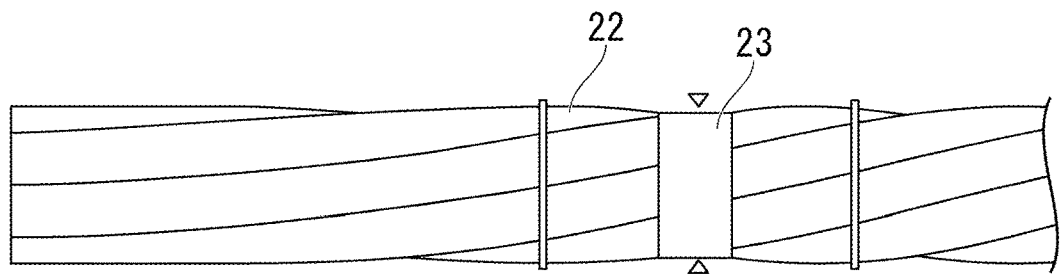
FIG. 4D is a view showing a cutting step in the method for manufacturing a combiner according to one or more embodiments.

Subsequent to the melting step, the melting portion 23 is cut using a tool or the like as shown in FIG. 4D (cutting step).

After the cutting step, an end surface of the melting portion 23 and an end surface of the relay fiber 24 in which the outer diameter of the clad 24a is larger than the outer diameter of the end surface of the melting portion 23 are fused together, thereby manufacturing the combiner 20A.

According to the method for manufacturing the combiner 20A, the plurality of input fibers 21 melt in a state of being gathered together in the melting step, and thus the glass portions of the input fibers 21 fuse together without a gap therebetween in association with the melting. Therefore, it is possible to easily limit the generation of a gap between the input fibers 21 in the melting portion 23.

In addition, the outer diameter of the clad 24a located on the outermost layer of the relay fiber 24 is larger than the outer diameter of the melting portion 23 in the interface I between the relay fiber 24 and the melting portion 23, and a level difference is provided in the fusion-spliced portion between the melting portion 23 and the relay fiber 24.

In addition, a tubular member for closely attaching the plurality of input fibers 21 together is not used.

Therefore, it becomes easy to eliminate the air in the gap between the outer circumferences of the glass portions of the input fibers 21 in the melting step. Therefore, it is possible to more reliably fuse the outer circumferences of the glass portions of the input fibers 21 without a gap.

In addition, in the bundling step, the plurality of input fibers 21 are twisted together in a state of being bundled with the end portion B0 fixed.

Therefore, it is possible to form the bundle portion 22 in a state in which the glass portions of the input fibers 21 are closely attached together.

In addition, the first fixing portion B1 and the second fixing portion B2 are formed of an adhesive material, and the outer circumferences of the plurality of input fibers 21 are in contact with each other in the bundle portion 22.

Therefore, it is possible to reliably maintain a state in which the outer circumferences of the glass portions of the input fibers 21 are in contact with each other. Furthermore, it is possible to limit an increase in the outer diameter of the combiner 20A.

The technical scope of the present invention is not limited to the above-described embodiments, and a variety of modifications can be added thereto within the scope of the gist of the present invention.

Figure 5:
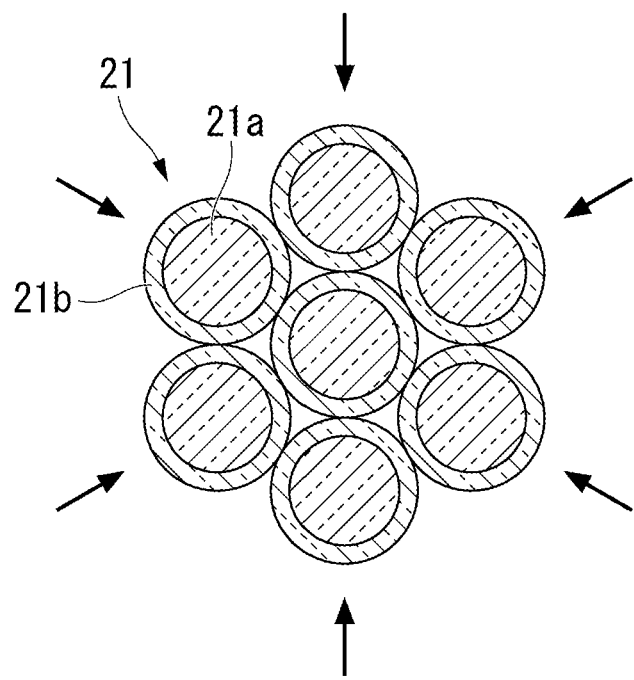
FIG. 5 is a view showing a method for manufacturing a combiner according to a modified example of one or more embodiments.

For example, the method for manufacturing the combiner 20A is not limited to the method shown in FIGS. 4A to 4D and may be appropriately modified. For example, in the bundling step, the input fibers 21 located on the outside may be pressed toward the input fiber 21 located in the center using a jig and a tool as shown in FIG. 5.

Additionally, in one or more embodiments, the combiner 20A that combines seven input fibers 21 and the relay fiber 24 has been described, but the number of the input fibers 21 that the combiner 20A combines is not limited thereto.

In addition, the configuration of the combiner 20A described in one or more embodiments may be applied to the configuration of the combiner 20B in a rear pumping light portion.

Additionally, it is possible to appropriately replace any of the configurational elements in the above-described embodiments with a well-known configurational element within the scope of the gist of the present invention, and the above-described embodiment or modification examples may be appropriately combined together.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . fiber laser device,
11A, 11B . . . front, rear pumping light source (pumping light source),
20A, 20B . . . first, second combiner (combiner),
21 . . . input fiber,
22 . . . bundle portion,
23 . . . melting portion,
24 . . . relay fiber,
24a . . . clad,
40 . . . amplification fiber,
B0 . . . end portion,
B1 . . . first fixing portion,
B2 . . . second fixing portion,
I . . . interface

What is claimed is:

1. A combiner that optically combines input fibers that propagate pumping light launched from pumping light sources and a relay fiber connected to an amplification fiber, the combiner comprising:
a bundle portion where the input fibers are bundled together; and
a melting portion where the input fibers are melted and integrated together, wherein
in an interface between the relay fiber and the melting portion, the input fibers are fused together without a gap between the input fibers,
the input fibers are attached together by a tube that is not disposed on an outer circumference of the melting portion, and
$S1/S2 \leq 1.21$ is satisfied, where S1 is a total value of transverse cross-sectional areas of the input fibers, and S2 is a transverse cross-sectional area of the melting portion at the interface.

2. The combiner according to claim 1, wherein
an outer diameter of a clad disposed on an outermost layer of the relay fiber is larger than an outer diameter of the melting portion at the interface, and
a fusion-spliced portion between the melting portion and the relay fiber includes a level difference.

3. The combiner according to claim 1, wherein
an entire outer circumferential surface of the melting portion is in contact with air.

4. A fiber laser device comprising:
the combiner according to claim 1.

5. A method for manufacturing a combiner that optically combines input fibers that propagate pumping light launched from pumping light sources and a relay fiber connected to an amplification fiber, the method comprising:
forming a bundle portion by gathering the input fibers together into a bundle;
fixing the bundle portion at a first fixing portion and a second fixing portion that are positioned at different locations in a longitudinal direction of the input fibers;
forming a melting portion by melting a portion of the bundle portion between the first fixing portion and the second fixing portion, and
cutting the melting portion, wherein $S1/S2 \leq 1.21$ is satisfied, where S1 is a total value of transverse cross-sectional areas of the input fibers, and S2 is a transverse cross-sectional area of the melting portion at an interface between the relay fiber and the melting portion.

6. The method for manufacturing a combiner according to claim 5, wherein
an outer diameter of a clad that is disposed on an outermost layer of the relay fiber is larger than an outer diameter of the melting portion at the interface between the relay fiber and the melting portion, and
a fusion-spliced portion between the melting portion and the relay fiber includes a level difference.

7. The method for manufacturing a combiner according to claim 5,
wherein input fibers are attached together without using a tube.

8. The method for manufacturing a combiner according to claim 5, wherein in forming the bundle portion, end portions of the input fibers are fixed when the input fibers are twisted together.

9. The method for manufacturing a combiner according to claim 5, wherein
the first fixing portion and the second fixing portion are an adhesive material, and
in the bundle portion, outer circumferences of the input fibers are in contact with one another.

10. The combiner according to claim 1, wherein the tube is not disposed on an outer circumference of the bundle portion.

* * * * *